(12) United States Patent
Solazzi

(10) Patent No.: US 9,339,954 B2
(45) Date of Patent: May 17, 2016

(54) PORTABLE SAMPLE PULVERIZING AND PELLETIZING SYSTEM AND METHOD

(71) Applicant: Michael C. Solazzi, Palm City, FL (US)

(72) Inventor: Michael C. Solazzi, Palm City, FL (US)

(*) Notice: Subject to any disclaimer, the term of this patent is extended or adjusted under 35 U.S.C. 154(b) by 0 days.

(21) Appl. No.: 14/507,980

(22) Filed: Oct. 7, 2014

(65) Prior Publication Data

US 2015/0165654 A1 Jun. 18, 2015

Related U.S. Application Data

(60) Provisional application No. 61/889,627, filed on Oct. 11, 2013.

(51) Int. Cl.
*B29C 43/02* (2006.01)
*B02C 1/14* (2006.01)
*B29L 31/00* (2006.01)

(52) U.S. Cl.
CPC . *B29C 43/02* (2013.01); *B02C 1/14* (2013.01); *B29L 2031/00* (2013.01)

(58) Field of Classification Search
None
See application file for complete search history.

(56) References Cited

U.S. PATENT DOCUMENTS

| | | | |
|---|---|---|---|
| 2,127,397 A | 3/1938 | Freedlander | |
| 2,144,255 A | 1/1939 | Carpenter | |
| 4,037,109 A | 7/1977 | Hosokowa et al. | |
| 4,046,138 A | 9/1977 | Libman et al. | |
| 4,148,732 A | 4/1979 | Burrow et al. | |
| 4,184,360 A | 1/1980 | Vadnay et al. | |
| 4,256,474 A | 3/1981 | Berger, Jr. et al. | |
| 4,301,010 A | 11/1981 | Eddleman et al. | |
| 4,346,299 A | 8/1982 | Mitteldorf | |
| 4,362,047 A | 12/1982 | vonReis et al. | |
| 4,402,909 A | 9/1983 | Solazzi | |
| 4,409,854 A | 10/1983 | Solazzi | |
| 4,448,311 A | 5/1984 | Houser | |
| 4,575,869 A | 3/1986 | Torrisi | |
| 4,587,666 A | 5/1986 | Torrisi | |
| 4,643,033 A | 2/1987 | Solazzi | |
| 4,665,759 A | 5/1987 | Solazzi | |
| 4,698,210 A | 10/1987 | Solazzi | |
| 4,961,916 A | 10/1990 | Lesage et al. | |
| 4,974,244 A | 11/1990 | Torrisi | |
| 4,982,615 A | 1/1991 | Sultan et al. | |
| 5,323,441 A | 6/1994 | Torrisi et al. | |
| 5,451,375 A | 9/1995 | Solazzi | |
| 5,454,020 A | 9/1995 | Solazzi | |
| RE35,506 E | 5/1997 | Solazzi | |
| 5,630,989 A | 5/1997 | Solazzi | |
| 6,009,766 A | 1/2000 | Solazzi | |
| 6,428,751 B1 | 8/2002 | Solazzi | |
| 7,722,821 B2 | 5/2010 | Solazzi | |
| 7,981,380 B2 | 7/2011 | Solazzi | |

(Continued)

FOREIGN PATENT DOCUMENTS

DE 1222425 8/1966

*Primary Examiner* — Mary F Theisen
(74) *Attorney, Agent, or Firm* — Keene IP Law

(57) ABSTRACT

A portable sample pulverizing and/or pelletizing system and method operable in conjunction with a repetitive impact device includes a base member with an upper surface, a hollow sample chamber with an open top end, an open bottom end disposed on the upper surface of the base member, and an internal annular cutaway portion adjacent the open top end; and a plunger member, which repetitively impacts a sample material disposed in the hollow sample chamber, the plunger member being configured at one end to matingly engage with a repetitive impact device.

36 Claims, 2 Drawing Sheets

(56) References Cited

U.S. PATENT DOCUMENTS 8,043,862 B2 10/2011 Solazzi
8,297,373 B2 * 10/2012 Elger .................... B25C 5/15
  173/100
8,404,197 B2 3/2013 Solazzi

* cited by examiner

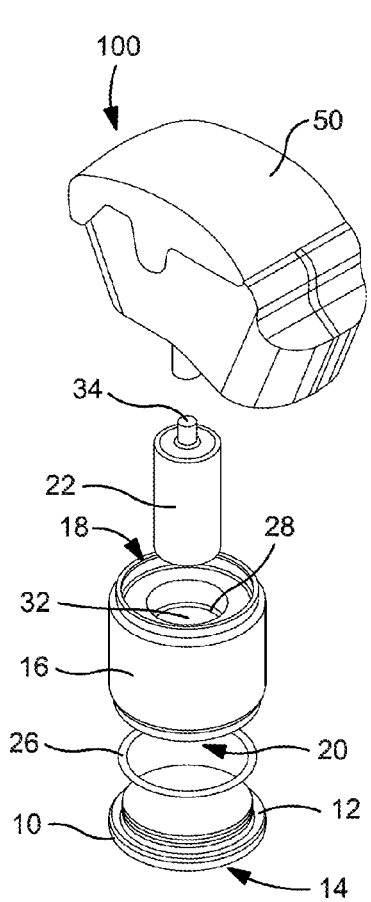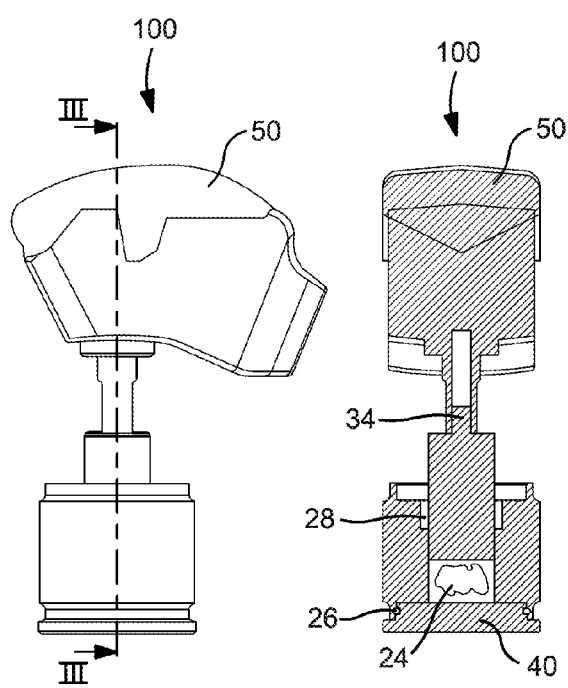
FIG. 1
FIG. 2
FIG. 3

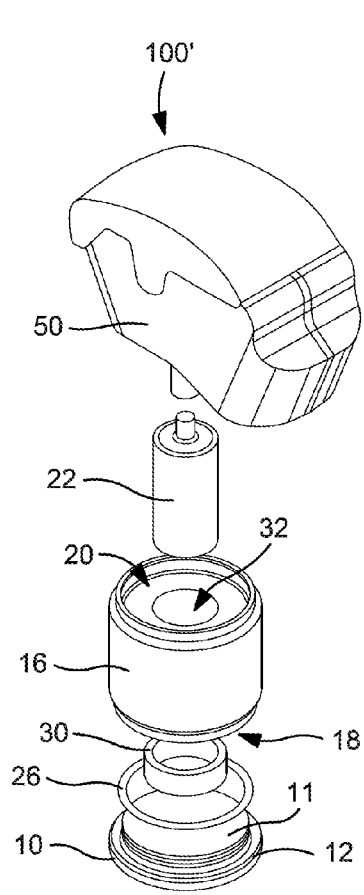
FIG. 4
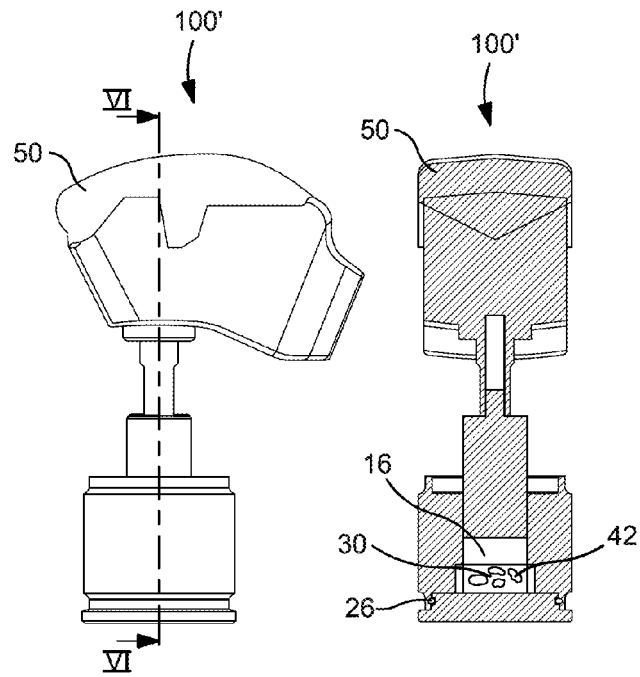
FIG. 5  FIG. 6
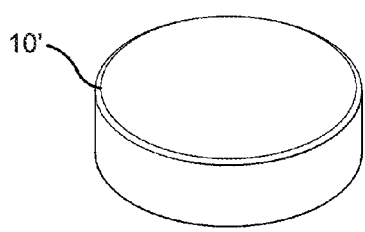
FIG. 7
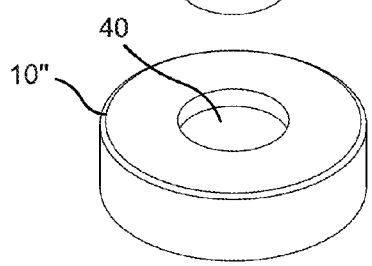
FIG. 8

PORTABLE SAMPLE PULVERIZING AND PELLETIZING SYSTEM AND METHOD

CROSS-REFERENCE TO RELATED APPLICATION

This application claims the benefit of U.S. Provisional Patent Application No. 61/889,627, filed on Oct. 11, 2013, the entire contents of which are hereby incorporated by reference herein.

FIELD OF THE INVENTION

The invention relates generally to preparing samples for analysis, including pulverizing solid samples into particulates, and also to pelletizing particulates, and more particularly, to pulverizing and pelletizing samples for X-Ray Fluorescence (XRF) and/or X-Ray Diffraction (XRD) spectroscopic analysis.

BACKGROUND OF THE INVENTION

Solid samples may include, for example, rocks, ore, sediment, minerals, cement, iron alloys, oil shale, slag, graphite, fiberglass, pesticides, fertilizer, and other complex and composite materials. To determine the elemental composition of a solid sample, including major and trace elements, or other characteristics, the sample must be broken down into smaller particles. For some analysis, that might be sufficient. Optionally the particles may then need to be compacted into a pellet or briquette to be suitable for analysis. The prepared samples are then subjected to spectroscopic analysis in a suitable XRF instrument, including energy-dispersive XRF or wave-dispersive XRF instruments. Analysis may take place either in the lab or using a hand-held XRF instrument in the field.

Conventional sample-preparing devices, for example, mills and grinders, use repetitive rotational or figure-eight mechanisms to prepare particulates from solid samples. In these devices, a solid sample is shaken with a freely moving object in a vessel. As the freely moving object strikes the wall of the vessel, the solid sample becomes trapped between the object and the wall of the vessel, which causes the solid sample to break down into particulates. After the particulates are formed, a conventional pellet press may be used to form the particulates into a pellet or briquette in order to be analyzed.

Many of the aforementioned sample-preparing devices are either floor-standing or table-top units with heavy-duty motors and other components which can weigh 100 to 500 pounds or more, and require large amounts of power for proper operation, and, although suitable for use in a lab, are not suited for use in the field, or at a site of interest, including a quarry or cement plant, due to the terrain or due to other constraints including a lack of power supply.

There remains a need for a portable sample pulverizing system, a portable pelletizing system, and a portable pulverizing and pelletizing system and method.

SUMMARY OF THE INVENTION

Briefly described, according to an aspect of the invention, a portable sample pulverizing system operable in conjunction with a repetitive impact device includes: a base member with an upper surface and a bottom surface; a hollow sample chamber with an open top end, and an open bottom end disposed on the upper surface of the base member; and a plunger member, which repetitively impacts a substantially solid sample disposed in the hollow sample chamber, the plunger member configured at one end to matingly engage with a repetitive impact device, wherein, a substantially solid sample contained in the hollow sample chamber is repetitively and linearly impacted through the open top end by the plunger member in communication with the repetitive impact device upon activation thereof, and transformed into particulates is provided.

Briefly described, according to an aspect of the invention, a portable sample pelletizing system operable in conjunction with a repetitive impact device includes: a base member with an upper surface and a bottom surface; a hollow sample chamber with an open bottom end, and an open top end disposed on the upper surface of the base, the hollow sample chamber including an internal annular cutaway portion adjacent the open top end; a pellet ring disposed in the internal annular cutaway portion of the hollow sample chamber; and a plunger member, which repetitively impacts particulates disposed in the hollow sample chamber, the plunger member configured at one end to matingly engage with a repetitive impact device, wherein, particulates contained in the hollow sample chamber are repetitively and linearly impacted through the open bottom end by the plunger member in communication with the repetitive impact device upon activation thereof, and transformed into a substantially uniformly dense pellet is provided.

Briefly described, according to another aspect of the invention, a portable sample combination pulverizing and pelletizing system operable in conjunction with a repetitive impact device includes: a base member with an upper surface and a bottom surface; a hollow chamber with an open top end, and an open bottom end disposed on the upper surface of the base member, the hollow sample chamber including an internal annular cutaway portion adjacent the open top end; a pellet ring disposed in the internal annular cutaway portion of the hollow sample chamber; and a plunger member, which repetitively impacts a substantially solid sample disposed in the hollow sample chamber, the plunger member configured at one end to matingly engage with a repetitive impact device, wherein, a substantially solid sample contained in the hollow sample chamber is repetitively and linearly impacted through the open top end by the plunger member in communication with the repetitive impact device upon activation thereof, and transformed into particulates, and upon inversion of the hollow sample chamber onto the base member, the particulates are repetitively and linearly impacted through the open bottom end by the plunger member in communication with the repetitive impact device upon activation thereof, and transformed into a substantially uniformly dense pellet is provided.

Briefly described, according to another aspect of the invention, a method for pulverizing solid samples into particulates in conjunction with a repetitive impact device includes the steps of: providing a base member with an upper surface and a bottom surface; disposing a hollow sample chamber with an open top end, and an open bottom end onto the upper surface of the base member; and providing a plunger member, which repetitively and linearly impacts a substantially solid sample disposed in the hollow sample chamber, the plunger member configured at one end to matingly engage with a repetitive impact device, wherein, a substantially solid sample contained in the hollow sample chamber is repetitively and linearly impacted through said open top end by said plunger member in communication with said repetitive impact device upon activation thereof, and transformed into particulates is also provided.

Briefly described, according to an aspect of the invention, a method for pelletizing particulates in conjunction with a repetitive impact device includes the steps of: providing a base member with an upper surface and a bottom surface; disposing a hollow sample chamber with an open bottom end, and an open top end onto the upper surface of the base member, the hollow sample chamber including an internal annular cutaway portion adjacent the open top end; disposing a pellet ring in the internal annular cutaway portion; providing a plunger member, which repetitively and linearly impacts particulates disposed in the hollow sample chamber, the plunger member configured at one end to matingly engage with a repetitive impact device, wherein, particulates contained in the hollow sample chamber are repetitively and linearly impacted through the open bottom end by said plunger member in communication with the repetitive impact device upon activation thereof, and transformed into a substantially uniformly dense pellet is also provided.

Briefly described, according to another aspect of the invention, a method for pulverizing solid samples into particulates, and pelletizing particulates in conjunction with a repetitive impact device includes the steps of: providing a base member with an upper surface and a bottom surface; disposing a hollow sample chamber with an open top end and, an open bottom end disposed on the upper surface of the base member, the hollow sample chamber including an internal annular cutaway portion adjacent said open top end; providing a plunger member, which repetitively and linearly impacts a substantially solid sample disposed in the hollow sample chamber, the plunger member configured to matingly engage with a repetitive impact device, wherein, a substantially solid sample contained in the hollow sample chamber is repetitively and linearly impacted by the plunger member through the open top end by the plunger member in communication with the repetitive impact device upon activation thereof, and transformed into the particulates; removing the particulates from the hollow sample chamber; disposing a pellet ring into the internal annular cutaway portion of the hollow sample chamber; inverting the hollow sample chamber and disposing the open top end onto the base member; adding the particulates into the inverted hollow sample chamber; wherein, the particulates contained in the hollow sample chamber are repetitively and linearly impacted by the plunger member in communication with the repetitive impact device upon activation thereof, and transformed into a substantially uniformly dense pellet is also provided.

BRIEF DESCRIPTION OF THE DRAWINGS

Throughout the drawings, like reference numerals are used to indicate common features of the described devices.

FIG. 1 is an exploded view of the portable sample pulverizing system according to an aspect of the invention;

FIG. 2 is a side view of the system of FIG. 1 according to an aspect of the invention;

FIG. 3 is a cross-sectional view along the lines III-III of FIG. 2, illustrating the base member, hollow sample chamber, plunger member, and repetitive impact device of the system according to an aspect of the invention;

FIG. 4 is an exploded view of the portable sample pelletizing system according to an aspect of the invention;

FIG. 5 is a side view of the system of FIG. 4 according to an aspect of the invention;

FIG. 6 is a cross-sectional view along the lines VI-VI of FIG. 5, illustrating the base member, hollow sample chamber, pellet ring, plunger member and repetitive impact device of the system according to an aspect of the invention;

FIG. 7 is a front perspective view of a base according to an aspect of the invention; and FIG. 8 is a front perspective view of a base according to an aspect of the invention.

The above-identified drawing figures set forth several of the embodiments of the invention. Other embodiments are also contemplated, as disclosed herein. The disclosure represents the invention, but is not limited thereby, as it should be understood that numerous other modifications and embodiments may be devised by those skilled in the art which fall within the scope and spirit of the invention as claimed.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded to the nearest significant figure.

Referring to FIG. 1, according to an aspect of the invention, a portable sample pulverizing system 100 is illustrated in conjunction with a repetitive impact device 50. The system 100 includes a base member 10, with an upper surface 12 and a bottom surface 14. An o-ring 26 may be disposed about the periphery of base member 10. The base member 10 illustrated in FIG. 1 has a centrally-raised portion 11. Alternatively, as illustrated in FIG. 7, base member 10' may be flat or planar, in which instance an o-ring 26 is not required. And, as illustrated in FIG. 8, the base member 10" may include a cavity 40 for receiving the hollow sample chamber 16, in which instance an o-ring is unnecessary.

Still referring to FIG. 1, the system 100 also includes a substantially cylindrical hollow sample chamber 16 with an open top end 18 and an open bottom end 20. As illustrated in FIG. 1, the open top end 18 includes an internal annular cutaway portion 28 for receiving a pellet ring 30 as will herein be described. Plunger member 22 slidably engages with the internal annular surface 32 of the hollow sample chamber 16 upon activation of the repetitive impact device 50. The upper end 34 of plunger member 22 is configured to matingly engage with device 50.

Referring now to FIG. 2, the device 50 illustrated is manufactured by Milwaukee Electric Tools, and described in U.S. Pat. No. 8,297,373, the entire disclosure of which is hereby incorporated by reference herein. Device 50 may be referred to as a palm nailer. Although a palm nailer is illustrated, it should be understood to those skilled in the art that other suitable devices may be employed in the system 100 (FIGS. 1-3) and 100' (FIGS. 4-6) according to an aspect of the invention, including auto hammers, jack hammers, devices that operate on compressed air, whether battery-powered or not, in which case the upper end 34 of plunger would be modified to operate with the selected device.

Referring to FIG. 3, the system 100 is illustrated with a substantially solid sample material 24 contained in the hollow sample chamber 16. Upon activation of the device 50, which is in communication with plunger member 22, the sample 24 contained in the chamber 16 is repetitively and linearly struck with plunger member 34, which impact causes the solid sample to break down into small particles, and smaller particles upon each impact.

Advantageously, the repetitive impact to the solid sample material 24 occurs over a relatively short time, i.e., it may take only seconds for particulates to start forming from a solid sample. Not to be bound or limited by, but by way of example only, the impacts delivered by the device 50 may be about 10 per minute, about 100 per minute, or about 1000 times per minute, or more.

Referring to FIG. 4, a system 100' according to an aspect of the invention is illustrated. In this aspect, after a solid sample material 24 has been pulverized into particulates 42 (FIG. 6), the particulates 42 are removed from the hollow sample chamber 16. The hollow sample chamber 16 is then inverted and open top end 18 is placed on the upper surface 12 of base member 10, with a pellet ring 30 disposed in the internal annular cutaway portion 32 adjacent the inverted open top end 18. Particulates formed from the solid sample are placed back into the hollow sample chamber 16. The plunger member 22 is then disposed in the hollow chamber and coupled to the repetitive impact device 50. When the device 50 is activated, the repetitive action of the plunger member 22 causes the particulates to be formed into a pellet, also referred to as a briquette.

Reference is now made to FIG. 5, which is a side view of the system 100', and to FIG. 6, which is a cross-sectional view taken along lines VI-VI of FIG. 5. As illustrated, the system 100' has a pellet ring 30 disposed within the internal annular cutaway portion 28 of hollow sample chamber 16. Particulates 42, which may have been formed by system 100, are illustrated in FIG. 6 in the inverted hollow sample chamber 16. When the system 100' is assembled with the repetitive impact device 50 in communication with the plunger member 22, the repetitive action from the device 50 is communicated to the plunger member 22, which causes the particulates 42 to be formed into a pellet. The resulting pellet is substantially and uniformly dense as required for accurate and precise analysis, and may be removed from the system 100', contained in the pellet ring 30. If the resulting pellet is not dense or uniform, an additive or binding material may be added to the particulates 42 prior to impact.

A method for pulverizing solid sample material in conjunction with a repetitive impact device includes the steps of: providing a base member with an upper surface and a bottom surface, disposing a hollow sample chamber with an open top end, and an open bottom end onto the upper surface of the base member; and providing a plunger member, which repetitively and linearly impacts a substantially solid sample disposed in the hollow sample chamber, the plunger member configured at one end to matingly engage with a repetitive impact device. A substantially solid sample contained in said hollow sample chamber is repetitively and linearly impacted through the open top end by one end of the plunger member, the opposite end of the plunger member being in communication with the repetitive impact device upon activation thereof, and transformed into particulates.

The method for pelletizing particulates in conjunction with a repetitive impact device includes the steps of providing a base member with an upper surface and a bottom surface; disposing a hollow sample chamber with an open bottom end, and an open top end onto the upper surface of the base member, the hollow sample chamber including an internal annular cutaway portion adjacent said open top end; disposing a pellet ring in the internal annular cutaway portion; providing a plunger member, which repetitively and linearly impacts particulates disposed in the hollow sample chamber, the plunger member configured at one end to matingly engage with a repetitive impact device. Particulates contained in the hollow sample chamber are repetitively and linearly impacted through the open bottom end by one end of the plunger member, the opposite end of the plunger member being in communication with the repetitive impact device upon activation thereof, and are transformed into a substantially uniformly dense pellet.

The method for pulverizing and pelletizing particulates in conjunction with a repetitive impact device includes the steps of: providing a base member with an upper surface and a bottom surface; disposing a hollow sample chamber with an open top end and, an open bottom end disposed on the upper surface of the base member, the hollow sample chamber including an internal annular cutaway portion adjacent the open top end; providing a plunger member, which repetitively and linearly impacts a substantially solid sample disposed in the hollow sample chamber, the plunger member configured to matingly engage with a repetitive impact device. A substantially solid sample contained in the hollow sample chamber is repetitively and linearly impacted by the plunger member through said open top end by the plunger member in communication with the repetitive impact device upon activation thereof, and transformed into particulates. Thereafter, the particulates are removed from the hollow sample chamber; and a pellet ring is placed into the internal annular cutaway portion of the hollow sample chamber. The sample chamber is inverted, and the open top end is disposed onto the base member. The particulates are then placed into the inverted hollow sample chamber, and are repetitively and linearly impacted by one end of the plunger member, the opposite end of the plunger member being in communication with the repetitive impact device upon activation thereof, and transformed into a substantially uniformly dense pellet.

The invention has been described with reference to specific embodiments. The benefits, other advantages, and solutions to problems have also been described above with regard to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

What is claimed is:

1. A portable sample pulverizing system operable in conjunction with a repetitive impact device, comprising:

a base member with an upper surface and a bottom surface;
a hollow sample chamber with an open top end, and an open bottom end disposed on said upper surface of said base member; and
a plunger member, which repetitively impacts a substantially solid sample disposed in said hollow sample chamber, said plunger member configured at one end to matingly engage with a repetitive impact device,
wherein, a substantially solid sample contained in said hollow sample chamber is repetitively and linearly impacted through said open top end by said plunger member in communication with said repetitive impact device upon activation thereof, and transformed into particulates.

2. The pulverizing system according to claim 1, wherein said repetitive impact device is a palm nailer.

3. The pulverizing system according to claim 1, wherein said repetitive impact device is an auto hammer.

4. The pulverizing system according to claim 1, wherein said repetitive impact device is an impact hammer.

5. The pulverizing system according to claim 1, wherein said repetitive impact device is powered by a battery.

6. The pulverizing system according to claim 1, wherein the repetitive impact device is powered by compressed air.

7. The pulverizing system according to claim 1, wherein the repetitive impact device is powered by a selected power source.

8. A portable sample pelletizing system operable in conjunction with a repetitive impact device, comprising:
a base member with an upper surface and a bottom surface;
a hollow sample chamber with an open bottom end, and an open top end disposed on said upper surface of said base, said hollow sample chamber including an internal annular cutaway portion adjacent said open top end;
a pellet ring disposed in the internal annular cutaway portion of said hollow sample chamber; and
a plunger member, which repetitively impacts particulates disposed in said hollow sample chamber, said plunger member configured at one end to matingly engage with a repetitive impact device,
wherein, particulates contained in said hollow sample chamber are repetitively and linearly impacted through said open bottom end by said plunger member in communication with said repetitive impact device upon activation thereof, and transformed into a substantially uniformly dense pellet.

9. The pelletizing system according to claim 8 wherein said repetitive impact device is a palm nailer.

10. The pelletizing system according to claim 8, wherein said repetitive impact device is an auto hammer.

11. The pelletizing system according to claim 8, wherein said repetitive impact device is an impact hammer.

12. The pelletizing system according to claim 8, wherein said repetitive impact device is powered by a battery.

13. The pelletizing system according to claim 8, wherein said repetitive impact device is powered by compressed air.

14. The pelletizing system according to claim 8, wherein the repetitive impact device is powered by a selected power source.

15. A portable sample pulverizing and pelletizing system operable in conjunction with a repetitive impact device, comprising:
a base member with an upper surface and a bottom surface,
a hollow chamber with an open top end, and an open bottom end disposed on said upper surface of said base member, said hollow sample chamber including an internal annular cutaway portion adjacent said open top end;
a pellet ring disposed in the internal annular cutaway portion of said hollow sample chamber; and
a plunger member, which repetitively impacts a substantially solid sample disposed in said hollow sample chamber, said plunger member configured at one end to matingly engage with a repetitive impact device,
wherein, a substantially solid sample contained in said hollow sample chamber is repetitively and linearly impacted through said open top end by said plunger member in communication with said repetitive impact device upon activation thereof, and transformed into particulates, and upon inversion of said hollow sample chamber onto said base member, said particulates are repetitively and linearly impacted through said open bottom end by said plunger member in communication with said repetitive impact device upon activation thereof, and transformed into a substantially uniformly dense pellet.

16. The pulverizing and pelletizing system according to claim 15, wherein said repetitive impact device is a palm nailer.

17. The pulverizing and pelletizing system according to claim 15, wherein said repetitive impact device is an auto hammer.

18. The pulverizing and pelletizing system according to claim 15, wherein said repetitive impact device is an impact hammer.

19. The pulverizing and pelletizing system according to claim 15, wherein said repetitive impact device is powered by a battery.

20. The pulverizing and pelletizing system according to claim 15, wherein said repetitive impact device is powered by compressed air.

21. The pulverizing and pelletizing system according to claim 15, wherein the repetitive impact device is powered by a selected power source.

22. A method for pulverizing solid samples into particulates in conjunction with a repetitive impact device, comprising the steps of:
providing a base member with an upper surface and a bottom surface;
disposing a hollow sample chamber with an open top end, and an open bottom end onto said upper surface of said base member; and
providing a plunger member, which repetitively and linearly impacts a substantially solid sample disposed in said hollow sample chamber, said plunger member configured at one end to matingly engage with a repetitive impact device,
wherein, a substantially solid sample contained in said hollow sample chamber is repetitively and linearly impacted through said open top end by said plunger member in communication with said repetitive impact device upon activation thereof, and transformed into particulates.

23. The method for pulverizing according to claim 22, wherein the repetitive impact device is a palm nailer.

24. The method for pulverizing according to claim 22, wherein said repetitive impact device is an auto hammer.

25. The method for pulverizing according to claim 22, wherein said repetitive impact device is an impact hammer.

26. The method for pulverizing according to claim 22, wherein said repetitive impact device is powered by a battery.

27. The method for pulverizing according to claim 22, wherein said repetitive impact device is powered by compressed air.

28. The method for pulverizing according to claim 22, wherein the repetitive impact device is powered by a selected power source.

29. A method for pelletizing particulates in conjunction with a repetitive impact device, comprising the steps of:
   providing a base member with an upper surface and a bottom surface;
   disposing a hollow sample chamber with an open bottom end, and an open top end onto said upper surface of said base member, said hollow sample chamber including an internal annular cutaway portion adjacent said open top end;
   disposing a pellet ring in the internal annular cutaway portion;
   providing a plunger member, which repetitively and linearly impacts particulates disposed in said hollow sample chamber, said plunger member configured at one end to matingly engage with a repetitive impact device,
   wherein, particulates contained in said hollow sample chamber are repetitively and linearly impacted through said open bottom end by said plunger member in communication with said repetitive impact device upon activation thereof, and transformed into a substantially uniformly dense pellet.

30. The method for pelletizing according to claim 29, wherein the repetitive impact device is a palm nailer.

31. The method for pelletizing according to claim 29, wherein said repetitive impact device is an auto hammer.

32. The method for pelletizing according to claim 29, wherein said repetitive impact device is an impact hammer.

33. A method for pulverizing solid samples into particulates, and pelletizing particulates in conjunction with a repetitive impact device, comprising the steps of:
   providing a base member with an upper surface and a bottom surface;
   disposing a hollow sample chamber with an open top end and, an open bottom end disposed on said upper surface of said base member, said hollow sample chamber including an internal annular cutaway portion adjacent said open top end;
   providing a plunger member, which repetitively and linearly impacts a substantially solid sample disposed in said hollow sample chamber, said plunger member configured to matingly engage with a repetitive impact device,
   wherein, a substantially solid sample contained in said hollow sample chamber is repetitively and linearly impacted by said plunger member through said open top end by said plunger member in communication with said repetitive impact device upon activation thereof, and transformed into particulates;
   removing said particulates from said hollow sample chamber;
   disposing a pellet ring into the internal annular cutaway portion of said hollow sample chamber;
   inverting said hollow sample chamber and disposing said open top end onto said base member;
   adding said particulates into said inverted hollow sample chamber;
   wherein, said particulates contained in said hollow sample chamber are repetitively and linearly impacted by said plunger member in communication with said repetitive impact device upon activation thereof, and transformed into a substantially uniformly dense pellet.

34. The method for pulverizing solid samples into particulates, and pelletizing particulates according to claim 33, wherein the repetitive impact device is a palm nailer.

35. The method for pulverizing solid samples into particulates, and pelletizing particulates according to claim 33, wherein the repetitive impact device is an auto-hammer.

36. The method for pulverizing solid samples into particulates, and pelletizing particulates according to claim 33, wherein the repetitive impact device is an impact hammer.

* * * * *